United States Patent
Basov et al.

(10) Patent No.: US 10,521,400 B1
(45) Date of Patent: Dec. 31, 2019

(54) DATA REDUCTION REPORTING IN STORAGE SYSTEMS

(71) Applicant: EMC IP Holding Company LLC, Hopkinton, MA (US)

(72) Inventors: Ivan Basov, Brookline, MA (US); Ahsan Rashid, Edison, NJ (US); Michal Marko, Fanwood, NJ (US); Walter Forrester, Berkeley Heights, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 351 days.

(21) Appl. No.: 15/664,253

(22) Filed: Jul. 31, 2017

(51) Int. Cl.
*G06F 16/174* (2019.01)
*G06F 16/182* (2019.01)

(52) U.S. Cl.
CPC ...... *G06F 16/1748* (2019.01); *G06F 16/1744* (2019.01); *G06F 16/184* (2019.01)

(58) Field of Classification Search
CPC . G06F 16/1748; G06F 16/1744; G06F 16/184
USPC ....................................................... 707/692
See application file for complete search history.

(56) References Cited

U.S. PATENT DOCUMENTS

| | | | | |
|---|---|---|---|---|
| 8,442,952 B1* | 5/2013 | Armangau | ......... | G06F 16/1752 707/686 |
| 8,615,499 B2* | 12/2013 | Chambliss | ......... | G06F 16/1748 707/693 |
| 8,615,500 B1* | 12/2013 | Armangau | ......... | G06F 16/1752 707/693 |
| 8,671,082 B1* | 3/2014 | Yadav | ................... | G06F 3/0641 707/692 |
| 8,898,114 B1* | 11/2014 | Feathergill | ......... | G06F 16/1752 707/648 |
| 9,152,628 B1* | 10/2015 | Stacey | ................ | G06F 16/1744 |
| 10,031,672 B2* | 7/2018 | Wang | ................. | G06F 16/1748 |
| 10,156,993 B1* | 12/2018 | Armangau | ............ | G06F 3/0608 |

(Continued)

OTHER PUBLICATIONS

Dutch M., "Understanding Data Deduplication Ratios", Storage Networking Industry Association (SNIA) Data Management Forum, Jun. 2008, 13 pages. (Year: 2008).*

(Continued)

*Primary Examiner* — Phuong Thao Cao
(74) *Attorney, Agent, or Firm* — Ryan, Mason & Lewis, LLP

(57) ABSTRACT

Methods and apparatus are provided for reporting space savings due to data reduction in storage systems. An exemplary method comprises establishing a leaf pointer for a plurality of allocation units of data in a storage system; for at least a first allocation unit of data matching a second allocation unit of data, replacing the leaf pointer for the first allocation unit with a deduplication pointer to the leaf pointer of the second allocation unit; determining a total number of pointers as a sum of a number of the leaf pointers and a number of the deduplication pointers; determining a difference between the total number of pointers and the number of leaf pointers; and providing a data reduction attributed to deduplication based on the difference. The allocation units of data are optionally also compressed. Data reduction attributed to the compression can optionally be determined independent of the data reduction attributed to the deduplication.

20 Claims, 13 Drawing Sheets

1000

Deduplication Space Savings Calculation Process

Establish leaf pointers for allocation units of data in storage system;

For first allocation units of data matching second allocation units of data, replace leaf pointer for first allocation units with deduplication pointers to leaf pointers of second allocation units;

Determine total number of pointers as a sum of number of leaf pointers and number of deduplication pointers;

Determine a difference between total number of pointers and number of leaf pointers; and Provide data reduction attributed to deduplication based on the difference.

(56) References Cited

U.S. PATENT DOCUMENTS

| | | | |
|---|---|---|---|
| 10,157,006 B1* | 12/2018 | Armangau | G06F 3/065 |
| 10,216,754 B1* | 2/2019 | Douglis | G06F 16/1744 |
| 2007/0027929 A1* | 2/2007 | Whelan | G06F 16/172 |
| 2009/0307251 A1* | 12/2009 | Heller | G06F 16/174 |
| 2010/0205158 A1* | 8/2010 | Dybas | G06F 16/1748 707/692 |
| 2010/0332401 A1* | 12/2010 | Prahlad | G06F 3/0649 705/80 |
| 2011/0307447 A1* | 12/2011 | Sabaa | H04L 67/2842 707/637 |
| 2011/0307659 A1* | 12/2011 | Hans | G06F 3/0613 711/114 |
| 2012/0150814 A1* | 6/2012 | Vijayan Retnamma | G06F 11/1453 707/674 |
| 2013/0054927 A1* | 2/2013 | Raj | G06F 3/0608 711/170 |
| 2013/0198148 A1* | 8/2013 | Chambliss | G06F 16/1748 707/692 |
| 2013/0227237 A1* | 8/2013 | Tashiro | G06F 3/0608 711/170 |
| 2014/0095439 A1* | 4/2014 | Ram | G06F 11/1464 707/640 |
| 2014/0156601 A1* | 6/2014 | Strunk | G06F 3/0619 707/639 |
| 2014/0214776 A1* | 7/2014 | Bolte | G06F 16/1748 707/692 |
| 2015/0088837 A1* | 3/2015 | Nag | G06F 3/0605 707/692 |
| 2016/0162509 A1* | 6/2016 | Berrington | G06F 11/1407 707/639 |
| 2016/0336960 A1* | 11/2016 | Henry | H03M 7/3086 |
| 2016/0336962 A1* | 11/2016 | Henry | H03M 7/3086 |
| 2016/0371292 A1* | 12/2016 | Narasimha | G06F 11/1453 |
| 2017/0010809 A1* | 1/2017 | Hironaka | G06F 12/023 |
| 2017/0123689 A1* | 5/2017 | Singhai | G06F 3/0613 |
| 2017/0131853 A1* | 5/2017 | Keller | G06F 3/14 |
| 2017/0131934 A1* | 5/2017 | Kaczmarczyk | G06F 3/0608 |
| 2017/0255417 A1* | 9/2017 | Dain | H04L 69/04 |
| 2017/0293450 A1* | 10/2017 | Battaje | G06F 3/0641 |
| 2018/0060367 A1* | 3/2018 | Ioannou | G06F 16/2272 |
| 2018/0198765 A1* | 7/2018 | Maybee | G06F 12/0813 |
| 2018/0260125 A1* | 9/2018 | Botes | G06F 3/0617 |
| 2018/0284995 A1* | 10/2018 | Dantkale | G06F 3/0611 |
| 2018/0285198 A1* | 10/2018 | Dantkale | G06F 12/128 |
| 2018/0349053 A1* | 12/2018 | Battaje | G06F 3/0641 |
| 2019/0026191 A1* | 1/2019 | Battaje | G06F 11/1453 |

OTHER PUBLICATIONS

Digital Guide (IONOS), "Data Reduction through Deduplication and Compression", Article dated May 19, 2017, 13 pages, accessed online at <https://www.ionos.com/digitalguide/server/know-how/data-reduction-through-deduplication-and-compression/> on Sep. 24, 2019. (Year: 2017).*

* cited by examiner

400

Upon Write operation:

410: Persistent File Data Cache (PFDC) aggregation logic of File System Manager 162 Aggregates Set of Allocation Units for Deduplication;

420: Establish DVBMs for each Allocation Unit;

430: Calculate SHA Hash Digest for each Allocation Unit;

440: Compare SHA Hash Digest for each Allocation Unit to (i) Top N Known SHA Digests, and (ii) SHA Digests in Deduplication Digest Database 500 (FIG. 5);

450: If an Existing Allocation Unit is Found with a Matching SHA Digest, then:

455: Replace DVBM for Allocation Unit Copy with Pointer to Leaf DVBM of Existing (Original) Allocation Unit; and 460: Increment Appropriate Space Savings Counters in SuperBock (FIG. 6)

FIG. 4

| Deduplication Digest Database 500 | | |
|---|---|---|
| Unique Block Identifier | SHA Value | Leaf D-VBM Pointer |
| | | |
| | | |
| | | |

FIG. 5

Space Savings Counters/Metrics:

AUsNeededIfNoDataReduction 610 dedupeSavingsIfNoCompression 615 dedupeRatio 620

ActiveExtentsAndUncompressedBlocks 625

ActiveSectorsAndUncompressedSectors 630

AUsNeededAfterDataReduction 635

CompressionSavingsAfterDedupe 640

CompressionSavingsIfNoDedupe 645

RefsToActiveExtentsAndUncompressedBlocks 650

RefsToActiveSectorsAndUncompressedSectors 655

AUsNeededIfNoDedupe 660

CompressionSavingsIfNoDedupe 665

ActualAUsUsed 670

IdealTotalSavings 675

RealTotalSavings 680

TotalGarbage 685

FIG. 6

```
Reporting Data Types 900 typedef struct {
    ...
    long long numFamilySpaceSavingsDueToCompression;
    long long numFamilySpaceSavingsDueToDedupe;
    long long numFamilySpaceSavingsDueToDataReduction;
    ulong64 numFamilySpaceSavingsDueToGarbageCollection;
} FamilyProperties;
```

FIG. 9

Deduplication Space Savings Calculation Process

Establish leaf pointers for allocation units of data in storage system;

For first allocation units of data matching second allocation units of data, replace leaf pointer for first allocation units with deduplication pointers to leaf pointers of second allocation units;

Determine total number of pointers as a sum of number of leaf pointers and number of deduplication pointers;

Determine a difference between total number of pointers and number of leaf pointers; and Provide data reduction attributed to deduplication based on the difference.

FIG. 10

DATA REDUCTION REPORTING IN STORAGE SYSTEMS

FIELD

The present application relates to reporting space savings in storage systems.

BACKGROUND

Some data storage systems employ data reduction techniques, such as compression, deduplication and/or pattern matching, to improve storage efficiency. As a result of such data reduction processing, the processed data requires less storage space than the original version of the data. A need exists for improved techniques for reporting the space savings that result from such data reduction techniques.

SUMMARY

Methods and apparatus are provided for reporting space savings due to data reduction in storage systems. In one embodiment, an exemplary method comprises establishing a leaf pointer for each of a plurality of allocation units of data in a storage system; for at least a first allocation unit of data matching a second allocation unit of data, replacing the leaf pointer for the first allocation unit with a deduplication pointer to the leaf pointer of the second allocation unit; determining a total number of pointers as a sum of a number of the leaf pointers and a number of the deduplication pointers; determining a difference between the total number of pointers and the number of leaf pointers; and providing a data reduction attributed to deduplication based on the difference.

In some embodiments, the allocation units of data are also compressed. In such embodiments, data reduction attributed to the compression can optionally be determined independent of the data reduction attributed to the deduplication.

Other illustrative embodiments include, without limitation, apparatus, systems, methods and computer program products comprising processor-readable storage media.

BRIEF DESCRIPTION OF THE DRAWINGS

FIG. 4 comprises exemplary pseudo code illustrating one or more processes that may be used in connection with the techniques described herein, according to an embodiment of the disclosure;

FIG. 5 is a sample table illustrating an exemplary implementation of the deduplication digest database of FIG. 1 in further detail, according to one embodiment of the disclosure;

FIG. 6 illustrates an exemplary implementation of the space savings counters and metrics of FIG. 1 in further detail, according to one embodiment of the disclosure;

FIG. 9 illustrates a number of exemplary data types for data reduction savings, according to an embodiment of the disclosure;

FIG. 10 illustrates exemplary pseudo code for a deduplication space savings calculation process, according to one embodiment of the disclosure;

DETAILED DESCRIPTION

Figure 1:
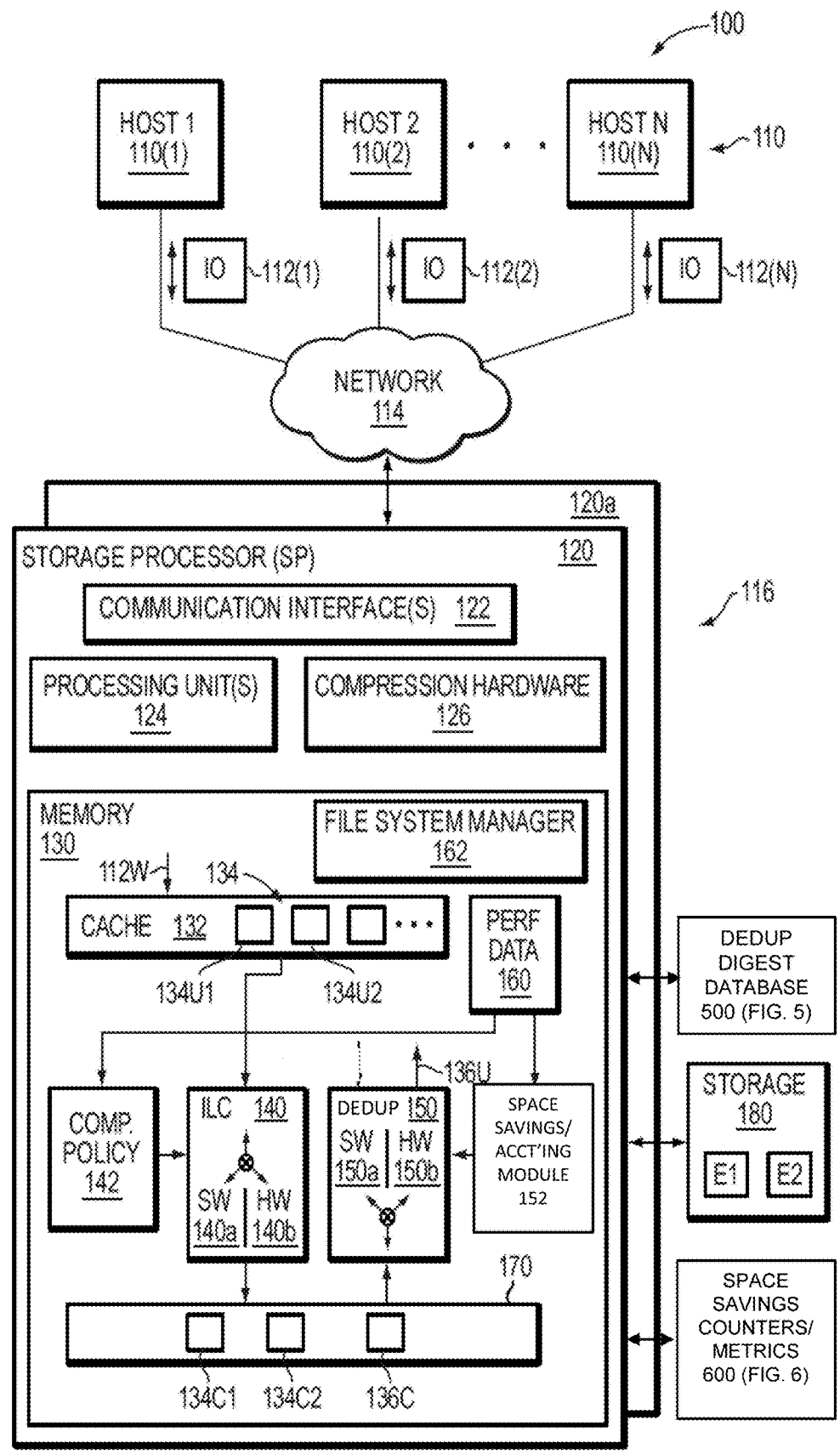
FIG. 1 is an example of an embodiment of a computer system that may utilize the techniques described herein.

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods and apparatus for reporting space savings due to data reduction in storage systems.

Data reduction is an efficiency feature that allows users to store information using less storage capacity than storage capacity used without data reduction. Data storage systems often employ data reduction techniques, such as data compression, deduplication and/or pattern matching, to improve storage efficiency. With such data reduction, users can significantly increase storage utilization for data, such as file data and block data. Data compression may be characterized as the process of encoding source information using an encoding scheme into a compressed form having fewer bits than the original or source information. Different encoding schemes may be used in connection with data compression.

In one or more deduplication embodiments of the disclosure, discussed further below in conjunction with FIG. 4, when a first allocation unit of data in a storage system matches a second allocation unit of data, the leaf pointer for the first allocation unit is replaced with a deduplication pointer to the leaf pointer of the second allocation unit. In some embodiments, the data reduction attributed to deduplication is obtained by determining a difference between (i) a total number of pointers comprised of a sum of a number of leaf pointers and a number of deduplication pointers, and (ii) the number of leaf pointers.

One or more embodiments of the disclosure maintain a number of counters and metrics, discussed further below in conjunction with FIG. 6, to report data reduction space savings. In some embodiments, compression and deduplication data reductions can be reported separately and/or in combination. For example, the data reduction savings attributed to compression can be reported independently of the data reduction attributed to deduplication. In addition, the data reduction savings attributed to deduplication can be reported independently of the data reduction attributed to compression.

Data reduction may be a LUN (logical unit number) attribute that can be enabled or disabled. When data reduction is enabled, data on a LUN may be processed as a background task. Compression, for example, may be performed in three different phases. The first phase comprises an initial compression that occurs when data compression is first enabled for a LUN. An entire LUN may be processed during this phase. The second phase is compression of new data that is sent by a host when the host sends a write request to a LUN. In such a case, the data is written in an uncompressed format and compressed asynchronously in the background at a later time. As a result, when new data is written to a compressed LUN, the consumed capacity of the compressed LUN may increase temporarily because the new data is not written in a compressed format initially. Further, when a storage system receives a new write request directed to compressed data, the compressed data may need to be first uncompressed, the uncompressed data is updated with the new write request, and updated uncompressed data is compressed again. Alternatively, when a storage system receives a new write request directed to compressed data, the compressed data may be left as-is and new data may be written to a new location.

Inline compression (also referred to herein as "ILC") provides the ability to reduce the amount of storage required to store user data on a storage device of a storage system by compressing portions of the data at the time the data is first written to the storage device. Further, storage system resources such as CPU resources, that may otherwise remain unused, are utilized to perform inline data compression on a write data path indicating that data is compressed prior to writing the data on a storage device. Generally, ILC may optionally be enabled by default on a storage system. However, a user may be provided the ability to make a decision regarding which storage objects should be subject to compression. Further, ILC is intended to lower the cost of storage consumed (e.g., dollars per gigabyte ($/GB)), but it is also a goal for ILC to improve the cost based on a number of IO (input/output) operations performed in a storage system (IOPs (input/output operations) performed in a specific time) through better utilization.

Data storage systems commonly arrange data in file systems, and file systems commonly store data, as well as metadata, in blocks. As is known, a "block" is the smallest unit of storage that a file system can allocate. Blocks for a given file system are generally of fixed size, such as 4 KB (kilobytes), 8 KB, or some other fixed size.

File systems typically categorize blocks as either allocated or free. Allocated blocks are those which are currently in use, whereas free blocks are those which are not currently in use. As a file system operates, the file system tends to allocate new blocks, to accommodate new data, but the file system also tends to generate new free blocks, as previously allocated blocks become free. The file system may run utilities (e.g., space maker, file system reorganizer) to coalesce ranges of contiguous free blocks. For example, a utility may move data found in allocated blocks between areas of the file system to create large regions of entirely free blocks. In various examples, the file system may return such regions of free blocks to a storage pool; the file system may also make such regions available to accommodate new writes of sequential data.

In a storage system enabled with inline data compression, data of the file system is generally compressed down to sizes smaller than a block and such compressed data is packed together in multi-block segments. Further, a file system manager may include a persistent file data cache (PFDC) aggregation logic that selects a set of allocation units (also referred to herein as "data fragments" or "storage extents" or "blocks") for compressing the set of allocation units and organizes the compressed allocation units in a segment. Further, each compressed allocation unit in a segment may also be simply referred to herein as a fragment. Thus, data of a file system may be stored in a set of segments. A segment may be composed from multiple contiguous blocks where data stored in the segment includes multiple compressed storage extents having various sizes.

Further, for each compressed storage extent in a segment of a file system, a corresponding weight is associated where the weight is arranged to indicate whether the respective storage extent is currently part of any file in the file system. In response to performing a file system operation that changes the weight of a storage extent in a segment of a file system to a value that indicates that the storage extent is no longer part of any file in the file system, the storage extent is marked as a free storage extent such that a scavenging utility can scavenge free space at a later time.

Conventionally, when a file system operation causes a file system to update data stored in an allocation unit, new data is written to a new location by allocating a new data fragment in a new segment. In such a conventional system, in such an example, the old allocation unit remains unused and may be scavenged by a storage space scavenging utility (e.g., space maker or garbage collection) during background processing at a later time. Further, generally, a storage space scavenging utility frees storage space associated with unused allocation units if there are sufficient numbers of allocation units in a segment that can be scavenged. For example, when each allocation unit in a segment is marked as unused, a scavenging utility frees storage space associated with the segment. Thus, in such a conventional system, data of a file system may be scattered throughout a set of segments such that there exists unused allocation units within various segments that have not been scavenged yet.

Conventionally, by allocating a new extent or allocation unit each time data of an existing extent or allocation unit of a file system is updated causes the file system to become fragmented over time, whereby storage for files of the file system may be allocated in small block portions of the underlying LUNs (logical storage units). In such a conventional system, each such small block portion may denote a logically contiguous set of LUN blocks or locations where the different contiguous block portions may be scattered or fragmented through the logical address space of the underlying LUN(s). Further, in such a conventional system, once a file system is fragmented, new sequential writes may not find contiguous free block sets within the file system address space to be allocated for a file. Consequently, in such a conventional system, the foregoing may result in a performance bottleneck in file systems, for example, storing data of file systems on physical storage devices, such as rotating disk drives, as well as in cases where rotating disk drives may be used in combination with flash memory devices or other solid state storage devices. Thus, in such a conventional system, allocating a new extent each time a request is received to overwrite data of an existing extent leads to wasting a significant amount of storage space when a file system performs a large number of over-write operations and reduces overall storage space savings associating with compression of data. In addition, generally, processing bandwidth of a storage space scavenging utility (e.g., space maker utility) is limited in nature which induces a flash wear in a conventional storage system by repeatedly writing to flash storage devices. Further, in such a conventional system, in at least one scenario, for example, all blocks that make up a segment may be allocated, even though the segment may contain enough free space to encompass one or more blocks. Yet, in such a conventional system, when working on segments containing compressed data, storage space scavenging utilities may fail to properly identify these areas and may thus consume valuable storage system resources inefficiently.

By contrast, at least some implementations in accordance with the current technique enable a file system to re-use data fragments (or "allocation units") of a compressed segment for updating data stored in such data fragments. In at least one embodiment of the current technique, re-using data fragments in a compressed segment reduces the processing performed by a storage space scavenging utility (e.g., space maker, garbage collection utility) for freeing storage space in a storage stripe thereby reducing a flash wear on a flash storage device. Further, in at least one embodiment of the current technique, in a storage system enabled with inline data compression, an existing data fragment is overwritten with new updated data upon determining that the existing data fragment has not been shared among two or more files and the size of the existing data fragment can accommodate the new updated data in a compressed format resulting from a subsequent write I/O request. Further, in at least one embodiment of the current technique, when updated data is written to an existing data fragment by re-using the existing data fragment, the compressed data fragment is aligned to a disk sector level in order to avoid copy-on-write operation when such data fragment is re-used.

Described in following paragraphs are techniques that may be used in an embodiment in accordance with the techniques disclosed herein to efficiently use contiguous free block sets of file system address space that may be allocated for use, for example, for a file system.

FIG. 1 depicts an example embodiment of a system that may be used in connection with performing the techniques described herein. Here, multiple host computing devices ("hosts") 110, shown as devices 110(1) through 110(N), access a data storage system 116 over a network 114. The data storage system 116 includes a storage processor, or "SP," 120 and storage 180. In one example, the storage 180 includes multiple disk drives, such as magnetic disk drives, electronic flash drives, optical drives, and/or other types of drives. Such disk drives may be arranged in RAID (Redundant Array of Independent/Inexpensive Disks) groups, for example, or in any other suitable way.

In an example, the data storage system 116 includes multiple SPs, like the SP 120 (e.g., a second SP, 120a). The SPs may be provided as circuit board assemblies, or "blades," that plug into a chassis that encloses and cools the SPs. The chassis may have a backplane for interconnecting the SPs, and additional connections may be made among SPs using cables. No particular hardware configuration is required, however, as any number of SPs, including a single SP, may be provided and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI (Internet Small Computer Systems interface), NFS (Network File System), SMB (Server Message Block) 3.0, and CIFS (Common Internet File System), for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180.

As further shown in FIG. 1, the SP 120 includes one or more communication interfaces 122, a set of processing units 124, compression hardware 126, and memory 130. The communication interfaces 122 may be provided, for example, as SCSI target adapters and/or network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs.

The compression hardware 126 includes dedicated hardware, e.g., one or more integrated circuits, chipsets, subassemblies, and the like, for performing data compression and decompression in hardware. The hardware is "dedicated" in that it does not perform general-purpose computing but rather is focused on compression and decompression of data. In some examples, compression hardware 126 takes the form of a separate circuit board, which may be provided as a daughterboard on SP 120 or as an independent assembly that connects to the SP 120 over a backplane, midplane, or set of cables, for example. A non-limiting example of compression hardware 126 includes the Intel® QuickAssist Adapter, which is available from Intel Corporation of Santa Clara, Calif.

The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a cache 132, an inline compression (ILC) engine 140, a dedup engine 150, and a data object 170. A compression policy 142 provides control input to the ILC engine 140. A space savings accounting module 152 optionally communicates with the deduplication engine 150. The deduplication engine 150 optionally performs deduplication by determining if a first allocation unit of data in the storage system matches a second allocation unit of data. When a match is found, the leaf pointer for the first allocation unit is replaced with a deduplication pointer to the leaf pointer of the second allocation unit, and one or more space savings counters are incremented, for example, by the space savings accounting module 152. In some embodiments, the data reduction attributed to deduplication is obtained by determining a difference between (i) a total number of pointers comprised of a sum of a number of leaf pointers and a number of deduplication pointers, and (ii) the number of leaf pointers.

In addition, the memory 130 may also optionally includes an inline decompression engine (not shown) and a decompression policy (not shown), as would be apparent to a person of ordinary skill in the art. Both the compression policy 142 and the decompression policy receive performance data 160, that describes a set of operating conditions in the data storage system 116.

In an example, the data object 170 is a host-accessible data object, such as a LUN, a file system, or a virtual machine disk (e.g., a VVol (Virtual Volume), available from VMWare, Inc. of Palo Alto, Calif.). The SP 120 exposes the data object 170 to hosts 110 for reading, writing, and/or other data operations. In one particular, non-limiting example, the SP 120 runs an internal file system and implements the data object 170 within a single file of that file system. In such an example, the SP 120 includes mapping (not shown) to convert read and write requests from hosts 110 (e.g., IO requests 112(1-N)) to corresponding reads and writes to the file in the internal file system.

As further shown in FIG. 1, ILC engine 140 includes a software component (SW) 140a and a hardware component (HW) 140b. The software component 140a includes a compression method, such as an algorithm, which may be implemented using software instructions. Such instructions may be loaded in memory and executed by processing units 124, or some subset thereof, for compressing data directly, i.e., without involvement of the compression hardware 126. In comparison, the hardware component 140b includes software constructs, such as a driver and API (application programmer interface) for communicating with compression hardware 126, e.g., for directing data to be compressed by the compression hardware 126. In some examples, either or both components 140a and 140b support multiple compression algorithms. The compression policy 142 and/or a user may select a compression algorithm best suited for current operating conditions, e.g., by selecting an algorithm that produces a high compression ratio for some data, by selecting an algorithm that executes at high speed for other data, and so forth.

For deduplicating data, the deduplication engine 150 includes a software component (SW) 150a and a hardware component (HW) 150b. The software component 150a includes a deduplication algorithm implemented using software instructions, which may be loaded in memory and executed by any of processing units 124 for deduplicating data in software. The hardware component 150b includes software constructs, such as a driver and API for communicating with optional deduplication hardware (not shown), e.g., for directing data to be deduplicated by the deduplication hardware. Either or both components 150a and 150b may support multiple deduplication algorithms. In some examples, the ILC engine 140 and the deduplication engine 150 are provided together in a single set of software objects, rather than as separate objects, as shown.

In one example operation, hosts 110(1-N) issue IO requests 112(1-N) to the data storage system 116 to perform reads and writes of data object 170. SP 120 receives the IO requests 112(1-N) at communications interface(s) 122 and passes them to memory 130 for further processing. Some IO requests 112(1-N) specify data writes 112 W, and others specify data reads 112R, for example. Cache 132 receives write requests 112 W and stores data specified thereby in cache elements 134. In a non-limiting example, the cache 132 is arranged as a circular data log, with data elements 134 that are specified in newly-arriving write requests 112 W added to a head and with further processing steps pulling data elements 134 from a tail. In an example, the cache 132 is implemented in DRAM (Dynamic Random Access Memory), the contents of which are mirrored between SPs 120 and 120a and persisted using batteries. In an example, SP 120 may acknowledge writes 112 W back to originating hosts 110 once the data specified in those writes 112 W are stored in the cache 132 and mirrored to a similar cache on SP 120a. It should be appreciated that the data storage system 116 may host multiple data objects, i.e., not only the data object 170, and that the cache 132 may be shared across those data objects.

When the SP 120 is performing writes, the ILC engine 140 selects between the software component 140a and the hardware component 140b based on input from the compression policy 142. For example, the ILC engine 140 is configured to steer incoming write requests 112 W either to the software component 140a for performing software compression or to the hardware component 140b for performing hardware compression.

In an example, cache 132 flushes to the respective data objects, e.g., on a periodic basis. For example, cache 132 may flush a given uncompressed element 134U1 to data object 170 via ILC engine 140. In accordance with compression policy 142, ILC engine 140 selectively directs data in element 134U1 to software component 140a or to hardware component 140b. In this example, compression policy 142 selects software component 140a. As a result, software component 140a receives the data of element 134U1 and applies a software compression algorithm to compress the data. The software compression algorithm resides in the memory 130 and is executed on the data of element 134U1 by one or more of the processing units 124. Software component 140a then directs the SP 120 to store the resulting compressed data 134C1 (the compressed version of the data in element 134U1) in the data object 170. Storing the compressed data 134C1 in data object 170 may involve both storing the data itself and storing any metadata structures required to support the data 134C1, such as block pointers, a compression header, and other metadata.

It should be appreciated that this act of storing data 134C1 in data object 170 provides the first storage of such data in the data object 170. For example, there was no previous storage of the data of element 134U1 in the data object 170. Rather, the compression of data in element 134U1 proceeds "inline," in one or more embodiments, because it is conducted in the course of processing the first write of the data to the data object 170.

Continuing to another write operation, cache 132 may proceed to flush a given element 134U2 to data object 170 via ILC engine 140, which, in this case, directs data compression to hardware component 140b, again in accordance with policy 142. As a result, hardware component 140b directs the data in element 134U2 to compression hardware 126, which obtains the data and performs a high-speed hardware compression on the data. Hardware component 140b then directs the SP 120 to store the resulting compressed data 134C2 (the compressed version of the data in element 134U2) in the data object 170. Compression of data in element 134U2 also takes place inline, rather than in the background, as there is no previous storage of data of element 134U2 in the data object 170.

In an example, directing the ILC engine 140 to perform hardware or software compression further entails specifying a particular compression algorithm. The algorithm to be used in each case is based on compression policy 142 and/or specified by a user of the data storage system 116. Further, it should be appreciated that compression policy 142 may operate ILC engine 140 in a pass-through mode, i.e., one in which no compression is performed. Thus, in some examples, compression may be avoided altogether if the SP 120 is too busy to use either hardware or software compression.

In some examples, storage 180 is provided in the form of multiple extents, with two extents E1 and E2 particularly shown. In an example, the data storage system 116 monitors a "data temperature" of each extent, i.e., a frequency of read and/or write operations performed on each extent, and selects compression algorithms based on the data temperature of extents to which writes are directed. For example, if extent E1 is "hot," meaning that it has a high data temperature, and the data storage system 116 receives a write directed to E1, then compression policy 142 may select a compression algorithm that executes at a high speed for compressing the data directed to E1. However, if extent E2 is "cold," meaning that it has a low data temperature, and the data storage system 116 receives a write directed to E2, then compression policy 142 may select a compression algorithm that executes at high compression ratio for compressing data directed to E2.

With the arrangement of FIG. 1, the SP 120 intelligently directs compression and other data reduction tasks to software or to hardware based on operating conditions in the data storage system 116. For example, if the set of processing units 124 are already busy but the compression hardware 126 is not, the compression policy 142 can direct more compression tasks to hardware component 140b. Conversely, if compression hardware 126 is busy but the set of processing units 124 are not, the compression policy 142 can direct more compression tasks to software component 140a. Decompression policy may likewise direct decompression tasks based on operating conditions, at least to the extent that direction to hardware or software is not already dictated by the algorithm used for compression. In this manner, the data storage system 116 is able to perform inline compression using both hardware and software techniques, leveraging the capabilities of both while applying them in proportions that result in best overall performance.

In such an embodiment in which element 120 of FIG. 1 is implemented using one or more data storage systems, each of the data storage systems may include code thereon for performing the techniques as described herein.

Servers or host systems, such as 110(1)-110(N), provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN may be used to refer to the foregoing logically defined devices or volumes.

The data storage system may be a single unitary data storage system, such as single data storage array, including two storage processors or compute processing units. Techniques herein may be more generally used in connection with any one or more data storage systems each including a different number of storage processors than as illustrated herein. The data storage system 116 may be a data storage array, such as a Unity™, a VNX™ or VNXe™ data storage array by EMC Corporation of Hopkinton, Mass., including a plurality of data storage devices 116 and at least two storage processors 120a. Additionally, the two storage processors 120a may be used in connection with failover processing when communicating with a management system for the storage system. Client software on the management system may be used in connection with performing data storage system management by issuing commands to the data storage system 116 and/or receiving responses from the data storage system 116 over a connection. In one embodiment, the management system may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

In some arrangements, the data storage system 116 provides block-based storage by storing the data in blocks of logical storage units (LUNs) or volumes and addressing the blocks using logical block addresses (LBAs). In other arrangements, the data storage system 116 provides file-based storage by storing data as files of a file system and locating file data using inode structures. In yet other arrangements, the data storage system 116 stores LUNs and file systems, stores file systems within LUNs, and so on.

As further shown in FIG. 1, the memory 130 includes a file system and a file system manager 162. A file system is implemented as an arrangement of blocks, which are organized in an address space. Each of the blocks has a location in the address space, identified by FSBN (file system block number). Further, such address space in which blocks of a file system are organized may be organized in a logical address space where the file system manager 162 further maps respective logical offsets for respective blocks to physical addresses of respective blocks at specified FSBNs. In some cases, data to be written to a file system are directed to blocks that have already been allocated and mapped by the file system manager 162, such that the data writes prescribe overwrites of existing blocks. In other cases, data to be written to a file system do not yet have any associated physical storage, such that the file system must allocate new blocks to the file system to store the data. Further, for example, FSBN may range from zero to some large number, with each value of FSBN identifying a respective block location. The file system manager 162 performs various processing on a file system, such as allocating blocks, freeing blocks, maintaining counters, and scavenging for free space.

In at least one embodiment of the current technique, an address space of a file system may be provided in multiple ranges, where each range is a contiguous range of FSBNs (File System Block Number) and is configured to store blocks containing file data. In addition, a range includes file system metadata, such as inodes, indirect blocks (IBs), and virtual block maps (VBMs), for example, as discussed further below in conjunction with FIG. 2. As is known, inodes are metadata structures that store information about files and may include pointers to IBs. IBs include pointers that point either to other IBs or to data blocks. IBs may be arranged in multiple layers, forming IB trees, with leaves of the IB trees including block pointers that point to data blocks. Together, the leaf IB's of a file define the file's logical address space, with each block pointer in each leaf IB specifying a logical address into the file. Virtual block maps (VBMs) are structures placed between block pointers of leaf IBs and respective data blocks to provide data block virtualization. The term "VBM" as used herein describes a metadata structure that has a location in a file system that can be pointed to by other metadata structures in the file system and that includes a block pointer to another location in a file system, where a data block or another VBM is stored. However, it should be appreciated that data and metadata may be organized in other ways, or even randomly, within a file system. The particular arrangement described above herein is intended merely to be illustrative.

Further, in at least one embodiment of the current technique, ranges associated with an address space of a file system may be of any size and of any number. In some examples, the file system manager 162 organizes ranges in a hierarchy. For instance, each range may include a relatively small number of contiguous blocks, such as 16 or 32 blocks, for example, with such ranges provided as leaves of a tree. Looking up the tree, ranges may be further organized in CG (cylinder groups), slices (units of file system provisioning, which may be 256 MB or 1 GB in size, for example), groups of slices, and the entire file system, for example. Although ranges as described above herein apply to the lowest level of the tree, the term "ranges" as used herein may refer to groupings of contiguous blocks at any level.

In at least one embodiment of the technique, hosts 110 (1-N) issue IO requests 112(1-N) to the data storage system 116. The SP 120 receives the IO requests 112(1-N) at the communication interfaces 122 and initiates further processing. Such processing may include, for example, performing read and write operations on a file system, creating new files in the file system, deleting files, and the like. Over time, a file system changes, with new data blocks being allocated and allocated data blocks being freed. In addition, the file system manager 162 also tracks freed storage extents. In an example, storage extents are versions of block-denominated data, which are compressed down to sub-block sizes and packed together in multi-block segments. Further, a file system operation may cause a storage extent in a range to be freed, e.g., in response to a punch-hole or write-split operation. Further, a range may have a relatively large number of freed fragments but may still be a poor candidate for free-space scavenging if it has a relatively small number of allocated blocks. With one or more candidate ranges identified, the file system manager 162 may proceed to perform free-space scavenging on such range or ranges. Such scavenging may include, for example, liberating unused blocks from segments (e.g., after compacting out any unused portions), moving segments from one range to another to create free space, and coalescing free space to support contiguous writes and/or to recycle storage resources by returning such resources to a storage pool. Thus, file system manager 162 may scavenge free space, such as by performing garbage collection, space reclamation, and/or free-space coalescing.

As shown in FIG. 1, the data storage system 116 further comprises a space savings accounting module 152 that implements the data reduction monitoring and reporting techniques described herein. As discussed further below in conjunction with FIG. 4, in one or more embodiments, the exemplary deduplication engine 150 optionally performs deduplication by determining if a first allocation unit of data in the storage system matches a second allocation unit of data by comparing SHA (Secure Hash Algorithm) hash values of the allocation units. The hash values of each (or, alternatively, the top N) original previously processed allocation units is stored in a deduplication digest database 500, as discussed further below in conjunction with FIG. 5.

When a match is found, the deduplication engine 150 replaces the leaf pointer for the first allocation unit with a deduplication pointer to the leaf pointer of the second allocation unit. One or more space savings counters are optionally incremented, for example, by the space savings accounting module 152.

As noted above, one or more embodiments of the disclosure maintain a number of space savings counters and metrics 600, discussed further below in conjunction with FIG. 6, to report data reduction space savings. In some embodiments, compression and deduplication data reductions can be reported separately and/or in combination. For example, the data reduction savings attributed to compression can be reported independently of the data reduction attributed to deduplication. In addition, the data reduction savings attributed to deduplication can be reported independently of the data reduction attributed to compression.

Figure 2:
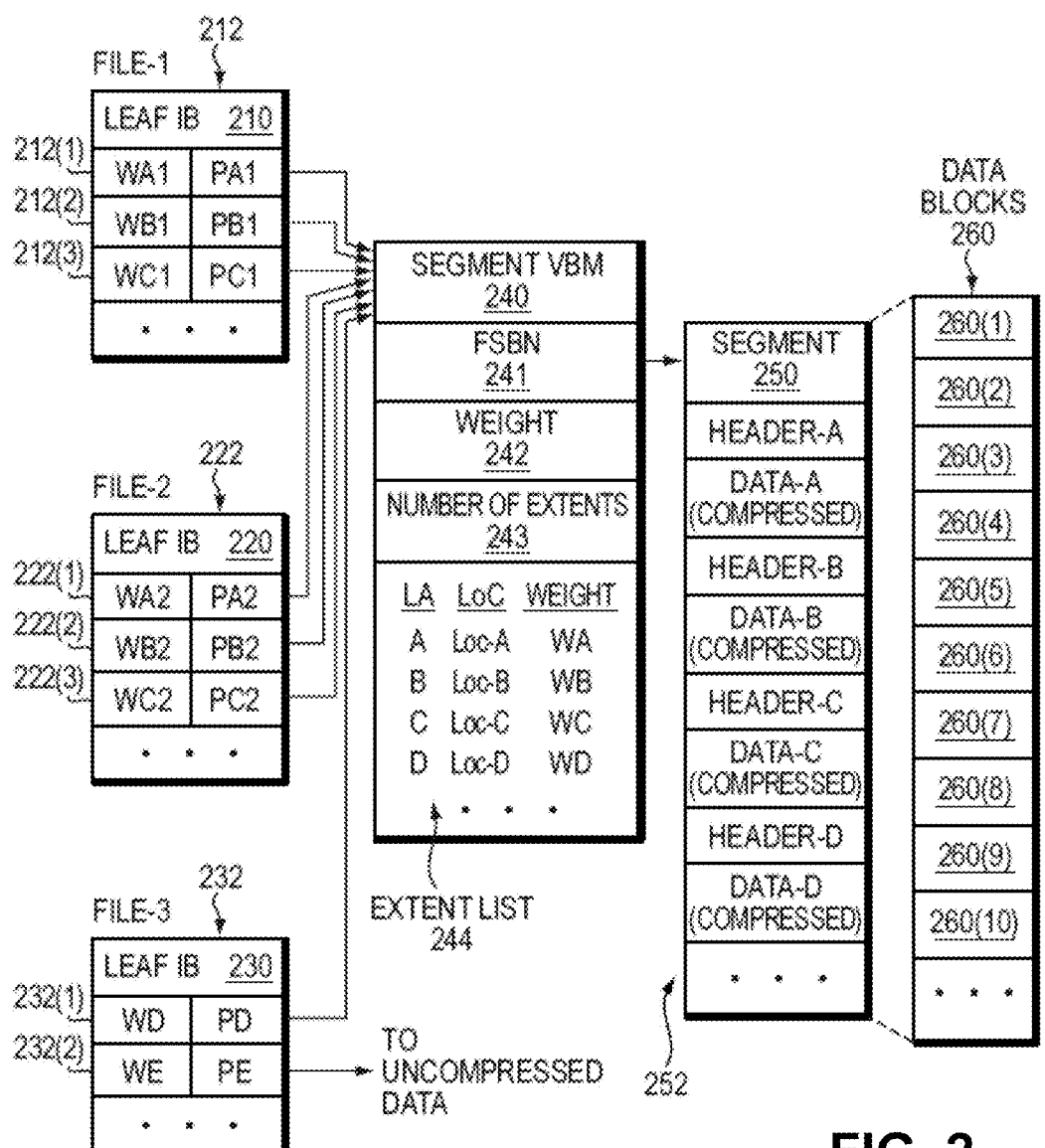
FIGS. 2, 3A and 3B illustrate in further detail components that may be used in connection with the techniques described herein, according to one embodiment of the disclosure.

Referring now to FIG. 2, shown is a more detailed representation of components that may be included in an embodiment using the techniques herein. As shown in FIG. 2, a segment 250 that stores data of a file system is composed from multiple data blocks 260. Here, exemplary segment 250 is made up of at least ten data blocks 260(1) through 260(10); however, the number of data blocks per segment may vary. In an example, the data blocks 260 are contiguous, meaning that they have consecutive FSBNs in a file system address space for the file system. Although segment 250 is composed from individual data blocks 260, the file system treats the segment 250 as one continuous space. Compressed storage extents 252, i.e., Data-A through Data-D, etc., are packed inside the segment 250. In an example, each of storage extents 252 is initially a block-sized set of data, which has been compressed down to a smaller size. An 8-block segment may store the compressed equivalent of 12 or 16 blocks or more of uncompressed data, for example. The amount of compression depends on the compressibility of the data and the particular compression algorithm used. Different compressed storage extents 252 typically have different sizes. Further, for each storage extent 252 in the segment 250, a corresponding weight is maintained, the weight arranged to indicate whether the respective storage extent 252 is currently part of any file in a file system by indicating whether other block pointers in the file system point to that block pointer.

The segment 250 has an address (e.g., FSBN 241) in the file system, and a segment VBM (Virtual Block Map) 240 points to that address. For example, segment VBM 240 stores a segment pointer 241, which stores the FSBN of the segment 250. By convention, the FSBN of segment 250 may be the FSBN of its first data block, i.e., block 260(1). Although not shown, each block 260(1)-260(10) may have its respective per-block metadata (BMD), which acts as representative metadata for the respective, block 260(1)-260 (10), and which includes a backward pointer to the segment VBM 240.

As further shown in FIG. 2, the segment VBM 240 stores information regarding the number of extents 243 in the segment 250 and an extent list 244. The extent list 244 acts as an index into the segment 250, by associating each compressed storage extent 252, identified by logical address (e.g., LA values A through D, etc.), with a corresponding location within the segment 250 (e.g., Location values Loc-A through Loc-D, etc., which indicate physical offsets) and a corresponding weight (e.g., Weight values WA through WD, etc.). The weights provide indications of whether the associated storage extents are currently in use by any files in the file system. For example, a positive number for a weight may indicate that at least one file in the file system references the associated storage extent 252. Conversely, a weight of zero may mean that no file in the file system currently references that storage extent 252. It should be appreciated, however, that various numbering schemes for reference weights may be used, such that positive numbers could easily be replaced with negative numbers and zero could easily be replaced with some different baseline value. The particular numbering scheme described herein is therefore intended to be illustrative rather than limiting.

In an example, the weight (e.g., Weight values WA through WD, etc.) for a storage extent 252 reflects a sum, or "total distributed weight," of the weights of all block pointers in the file system that point to the associated storage extent. In addition, the segment VBM 240 may include an overall weight 242, which reflects a sum of all weights of all block pointers in the file system that point to extents tracked by the segment VBM 240. Thus, in general, the value of overall weight 242 should be equal to the sum of all weights in the extent list 242.

Various block pointers 212, 222, and 232 are shown to the left in FIG. 2. In an example, each block pointer is disposed within a leaf IB (Indirect Block), also referred to herein as a mapping pointer, which performs mapping of logical addresses for a respective file to corresponding physical addresses in the file system. Here, leaf IB 210 is provided for mapping data of a first file (F1) and contains block pointers 212(1) through 212(3). Also, leaf IB 220 is provided for mapping data of a second file (F2) and contains block pointers 222(1) through 222(3). Further, leaf IB 230 is provided for mapping data of a third file (F3) and contains block pointers 232(1) and 232(2). Each of leaf IBs 210, 220, and 230 may include any number of block pointers, such as 1024 block pointers each; however, only a small number are shown for ease of illustration. Although a single leaf IB 210 is shown for file-1, the file-1 may have many leaf IBs, which may be arranged in an IB tree for mapping a large logical address range of the file to corresponding physical addresses in a file system to which the file belongs. A "physical address" is a unique address within a physical address space of the file system.

Each of block pointers 212, 222, and 232 has an associated pointer value and an associated weight. For example, block pointers 212(1) through 212(3) have pointer values PA1 through PC1 and weights WA1 through WC1, respectively, block pointers 222(1) through 222(3) have pointer values PA2 through PC2 and weights WA2 through WC2, respectively, and block pointers 232(1) through 232(2) have pointer values PD through PE and weights WD through WE, respectively.

Regarding files F1 and F2, pointer values PA1 and PA2 point to segment VBM 240 and specify the logical extent for Data-A, e.g., by specifying the FSBN of segment VBM 240 and an offset that indicates an extent position. In a like manner, pointer values PB1 and PB2 point to segment VBM 240 and specify the logical extent for Data-B, and pointer values PC1 and PC2 point to segment VBM 240 and specify the logical extent for Data-C. It can thus be seen that block pointers 212 and 222 share compressed storage extents Data-A, Data-B, and Data-C. For example, files F1 and F2 may be snapshots in the same version set. Regarding file F3, pointer value PD points to Data-D stored in segment 250 and pointer value PE points to Data-E stored outside the segment 250. File F3 does not appear to have a snapshot relationship with either of files F1 or F2. If one assumes that data block sharing for the storage extents 252 is limited to that shown, then, in an example, the following relationships may hold:

$WA=WA1+WA2;$ $WB=WB1+WB2;$ $WC=WC1+WC2;$ $WD=WD;$ and

Weight 242=(for $i=a$ through $d$, plus any additional extents 252 tracked by extent list 244).

The detail shown in segment 450 indicates an example layout 252 of data items. In at least one embodiment of the current technique, each compression header is a fixed-size data structure that includes fields for specifying compression parameters, such as compression algorithm, length, CRC (cyclic redundancy check), and flags. In some examples, the header specifies whether the compression was performed in hardware or in software. Further, for instance, Header-A can be found at Loc-A and is immediately followed by compressed Data-A. Likewise, Header-B can be found at Loc-B and is immediately followed by compressed Data-B. Similarly, Header-C can be found at Loc-C and is immediately followed by compressed Data-C.

For performing writes, the ILC engine 140 generates each compression header (Header-A, Header-B, Header-C, etc.) when performing compression on data blocks 260, and directs a file system to store the compression header together with the compressed data. The ILC engine 140 generates different headers for different data, with each header specifying a respective compression algorithm. For performing data reads, a file system looks up the compressed data, e.g., by following a pointer 212, 222, 232 in the leaf IB 210, 220, 230 to the segment VBM 240, which specifies a location within the segment 250. A file system reads a header at the specified location, identifies the compression algorithm that was used to compress the data, and then directs the ILDC engine to decompress the compressed data using the specified algorithm.

In at least one embodiment of the current technique, for example, upon receiving a request to overwrite and/or update data of data block (Data-D) pointed to by block pointer 232($a$), a determination is made as to whether the data block (Data-D) has been shared among any other file. Further, a determination is made as to whether the size of the compressed extent (also referred to herein as "allocation unit") storing contents of Data-D in segment 250 can accommodate the updated data. Based on the determination, the updated data is written in a compressed format to the compressed extent for Data-D in the segment 250 instead of allocating another allocation unit in a new segment.

For additional details regarding the data storage system of FIGS. 1 and 2, see, for example, U.S. patent application Ser. No. 15/393,331, filed Dec. 29, 2016 (now U.S. Pat. No. 10,157,006), entitled "Managing Inline Data Compression in Storage Systems," incorporated by reference herein in its entirety.

Figure 3A:
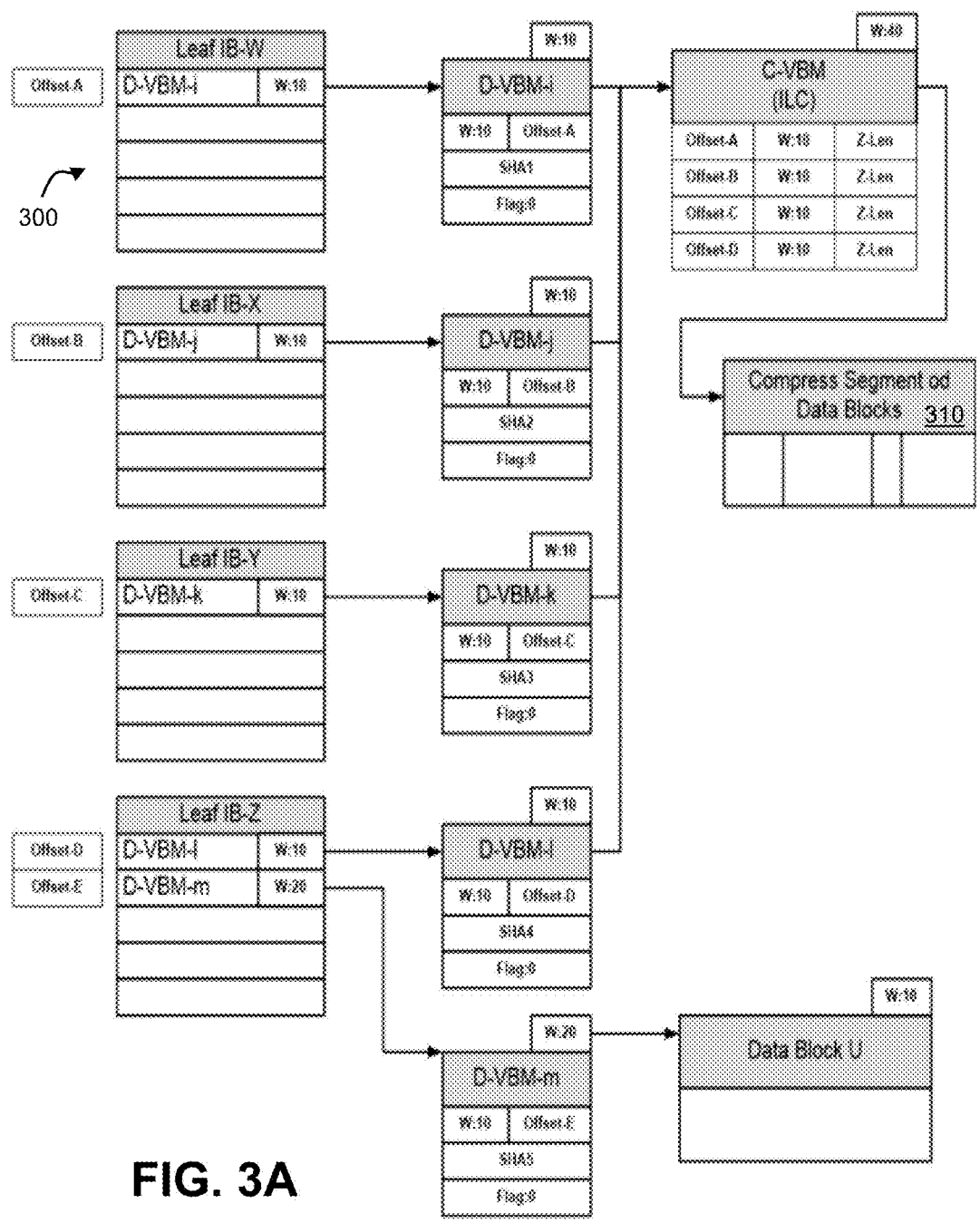
Figure 3B:
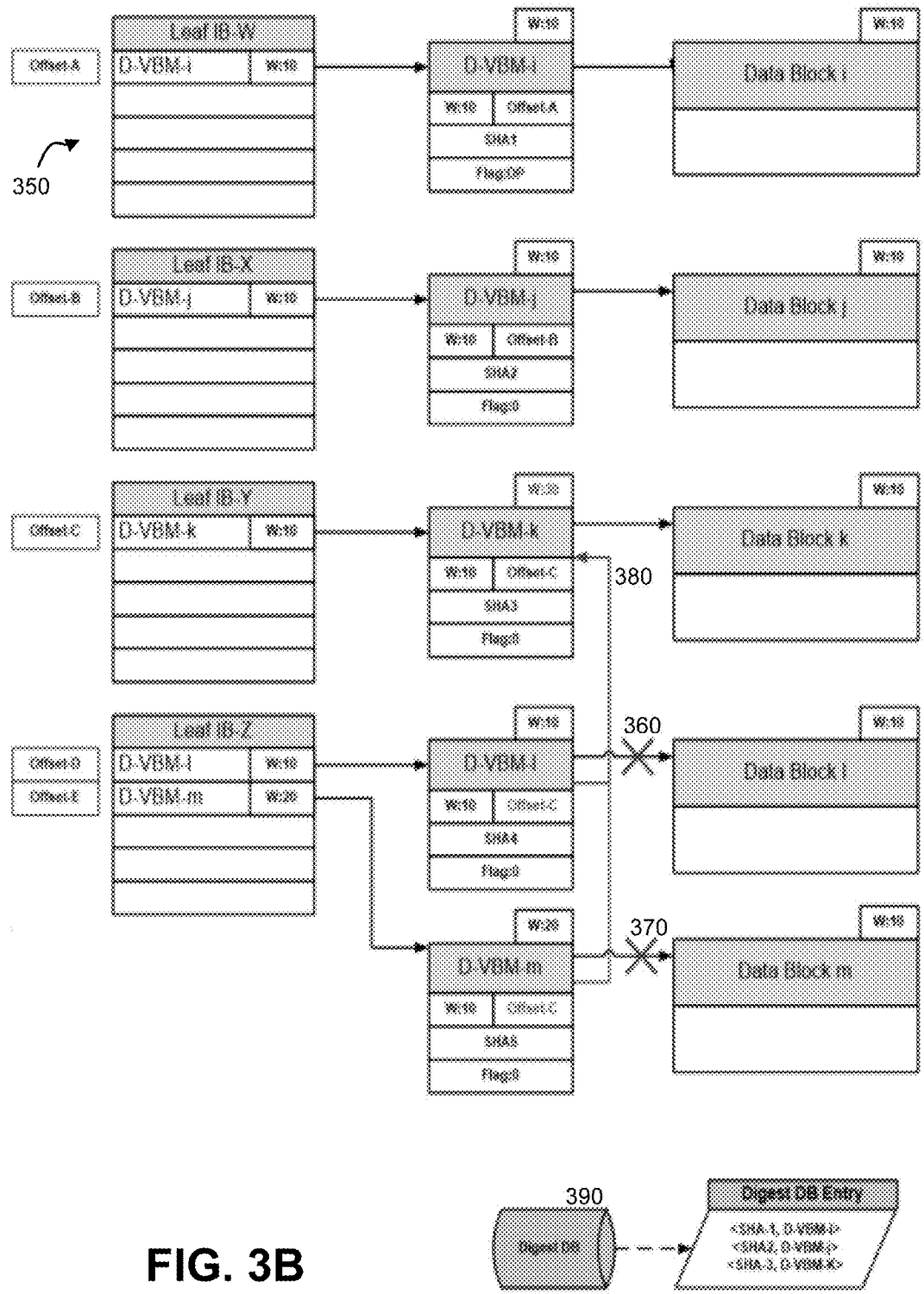

FIGS. 3A and 3B illustrate similar arrangements 300, 350 as FIG. 2, with the segment mapping aspects 240, 250 omitted for ease of illustration, according to an exemplary deduplication embodiment of the disclosure. FIGS. 3A and 3B illustrate the arrangement 300 or 350 before and after application of a deduplication operation, respectively. In the exemplary arrangements 300, 350 of FIGS. 3A and 3B, the leaf IBs (Indirect Blocks) 210, 220, 230 of FIG. 2 are shown as Leaf IB-W through Leaf IB-Z. In addition, the compressed segment VBM 240 of FIG. 2 is shown as a compressed VBM (C-VBM). The exemplary compressed segment 250 and data blocks 260(1) through 260(10) of FIG. 2 are shown as compressed segment 250 and compressed data blocks 310, for ease of illustration. As shown in FIG. 3A, the exemplary C-VBM indicates the offset, weight and length of each corresponding block or allocation unit in the compressed segment 250.

In addition, the exemplary arrangement 300 of FIG. 3A also comprises deduplication VBMs D-VBM-i through D-VBM-m, and a data block U (uncompressed data block). Generally, the deduplication VBMs (D-VBMs) provide a layer between the leaf IBs (Leaf IB-W through Leaf IB-Z) and the object that represents the data (e.g., a data block or an ILC-VBM). The D-VBMs are added to facilitate deduplication processing, as discussed herein. D-VBM-i through D-VBM-l are associated with compressed extents of various allocation units and D-VBM-i through D-VBM-l point to the C-VBM representing the compressed extents. In addition, D-VBM-m is associated with an uncompressed data block and points to the corresponding data block (data block U).

The exemplary leaf IBs Leaf IB-W through Leaf IB-Z of FIG. 3A identify a D-VBM for each block or allocation unit, as well a corresponding weight of the allocation unit. The D-VBMs identify the weight and offset for the corresponding allocation unit, as well as the SHA hash value of the allocation unit (used for deduplication, as discussed further below in conjunction with FIG. 4), in one or more embodiments. The D-VBM is used to recognize matching data blocks for deduplication. The D-VBMs also optionally include a flag indicating whether the corresponding allocation unit has been deduplicated.

As noted above, the exemplary arrangement 350 of FIG. 3B illustrates the data structures of the arrangement 300 of FIG. 3A, after application of a deduplication operation. In the example of FIG. 3B, the allocation units associated with D-VBM-k, D-VBM-l and D-VBM-m are determined by the deduplication process (e.g., in FIG. 4) to have the same SHA hash value. In other words, SHA3, SHA4 and SHA5 are equivalent values and the corresponding allocation units are copies of one another. Thus, as shown in FIG. 3B, the D-VBM pointers 360, 370 for the copies (D-VBM-l and D-VBM-m) to the respective data blocks l and m are replaced with a pointer 380 to the D-VBM (D-VBM-k) of the original version.

FIG. 3B also illustrates a deduplication digest database 390, as discussed further below in conjunction with FIG. 5, that records hash values (e.g., SHA-1) of the original previously processed allocation units (e.g., identified by D-VBM-i) of FIG. 3B. Generally, the exemplary deduplication digest database 390 records pair hints of <SHA, VBM> (VBM: D-VBM). The exemplary deduplication digest database 390 is updated, for example, after each deduplication operation or garbage collection operation is performed.

FIG. 4 comprises exemplary pseudo code 400 illustrating one or more processes that may be used in connection with the deduplication techniques described herein, according to an embodiment of the disclosure. As shown in FIG. 4, the exemplary pseudo code 400 is initiated upon a write operation.

Initially, the PFDC aggregation logic of the file system manager 162 aggregates a set of allocation units (e.g., "data fragment;" "storage extent" or "blocks") during step 410 for deduplication. The D-VBMs of FIGS. 3A and 3B are established for each allocation unit during step 420. During step 430, the SHA hash digest is calculated for each allocation unit.

The SHA hash digest for each allocation unit is compared during step 440 to (i) a set of Top N known SHA Digests, for example, stored in-memory and performed in-line for faster processing; and/or (ii) the SHA Digests in the deduplication digest database 500 (FIG. 5), for example, stored on-disk and processed using a background process.

If an existing allocation unit is found with a matching SHA digest during step 450, then the D-VBM for the allocation unit copy is replaced with a pointer to the leaf D-VBM of the existing (Original) allocation unit during step 455, and the appropriate space savings counters are incremented, for example, in the SuperBock, as discussed further below in conjunction with FIG. 6.

Generally, the leaf D-VBM (also referred to as a primary D-VBM) is the D-VBM that points directly to the data object, data block or ILC-VBM; and the deduplication pointer (also referred to as a secondary D-VBM) is the D-VBM that points to the leaf or primary D-VBM after the deduplication processing.

FIG. 5 is a sample table illustrating an exemplary implementation of the deduplication digest database 500 of FIG. 1 in further detail, according to one embodiment of the disclosure. As shown in FIG. 5, the exemplary deduplication digest database 500, for each unique allocation unit or block, provides an identifier, the SHA hash value and a pointer to the leaf D-VBM.

FIG. 6 illustrates an exemplary implementation of the space savings counters and metrics 600 of FIG. 1 in further detail, according to one embodiment of the disclosure. In one or more embodiments, the space savings counters and metrics 600 are maintained on-disk in the SuperBlock or other file system metadata by the space saving module 152 of FIG. 1. Further, the space savings counters and metrics 600 are optionally updated for each IO operation (e.g., write, punch hole, and deallocate).

As shown in FIG. 6, the exemplary space savings counters and metrics 600, in one or more embodiments, comprise an AUsNeededIfNoDataReduction counter 610 that tracks the number of allocation units that would be needed to store the data of the file system (and any snapshots of such data) if data reduction (e.g., compression and deduplication) was not performed.

The dedupeSavingsIfNoCompression metric 615 shown in FIG. 6 is based on a difference between (i) a total number of pointers (a sum of a number of leaf pointers and a number of deduplication pointers), and (ii) the number of leaf pointers.

A dedupeRatio 620 may be computed, as follows:

$$= \frac{AUsNeededIfNoDataReduction(610)}{AUsNeededIfNoDataReduction(610) - DedupeSavingsIfNoCompression(615)}$$

Generally, the dedupeRatio 620 is an approximation of the number of allocation units, because deduplication will not be uniform for the entire file system.

An ActiveExtentsAndUncompressedBlocks counter 625 is comprised of the number of active extents (e.g., useful, compressed allocation units or blocks) and the number of uncompressed blocks.

An ActiveSectorsAndUncompressedSectors counter 630 is comprised of the number of active sectors (e.g., useful sectors, where a given sector corresponds to 2 blocks in some embodiments) and the number of uncompressed sectors.

An AUsNeededAfterDataReduction counter 635 indicates the number of blocks needed to store the active sectors and uncompressed sectors.

CompressionSavingsAfterDedupe metric 640 may be computed, as follows:

=ActiveExtentsAndUncompressedBlocks(625)−AusNeededAfterDataReduction(635).

A CompressionSavingsIfNoDedupe metric 645 may be computed, as follows:

=CompressionSavingsAfterDedupe(640)*dedupeRatio(620).

A RefsToActiveExtentsAndUncompressedBlocks counter 650 indicates the number of references to active extents (e.g., useful, compressed allocation units or blocks) and to uncompressed blocks.

RefsToActiveSectorsAndUncompressedSectors counter 655 indicates the number of references to active sectors (e.g., useful sectors, where a given sector corresponds to 2 blocks in some embodiments) and to uncompressed sectors. The counter 655 tracks the number of original allocation units and copies of allocation units.

An AUsNeededIfNoDedupe counter 660 may be computed, as follows:

=howmany(RefsToActiveSectorsAndUncompressedSectors(655),16), indicating the number of references, in blocks, to active sectors and to uncompressed sectors.

A CompressionSavingsIfNoDedupe metric 665 may be obtained, as follows:

=RefsToActiveExtentsAndUncompressedBlocks(650)–AusNeededIfNoDedupe(660).

The ActualAUsUsed counter 670 indicates the number of allocation units used to store the data of the file system, after data reduction, as indicated in the SuperBlock or other file system metadata.

In addition, the exemplary space savings counters and metrics 600, in one or more embodiments, comprise an IdealTotalSavings metric 675; a RealTotalSavings metric 680; and a TotalGarbage metric 685, as discussed further below in conjunction with FIGS. 7 and 8.

Figure 7:
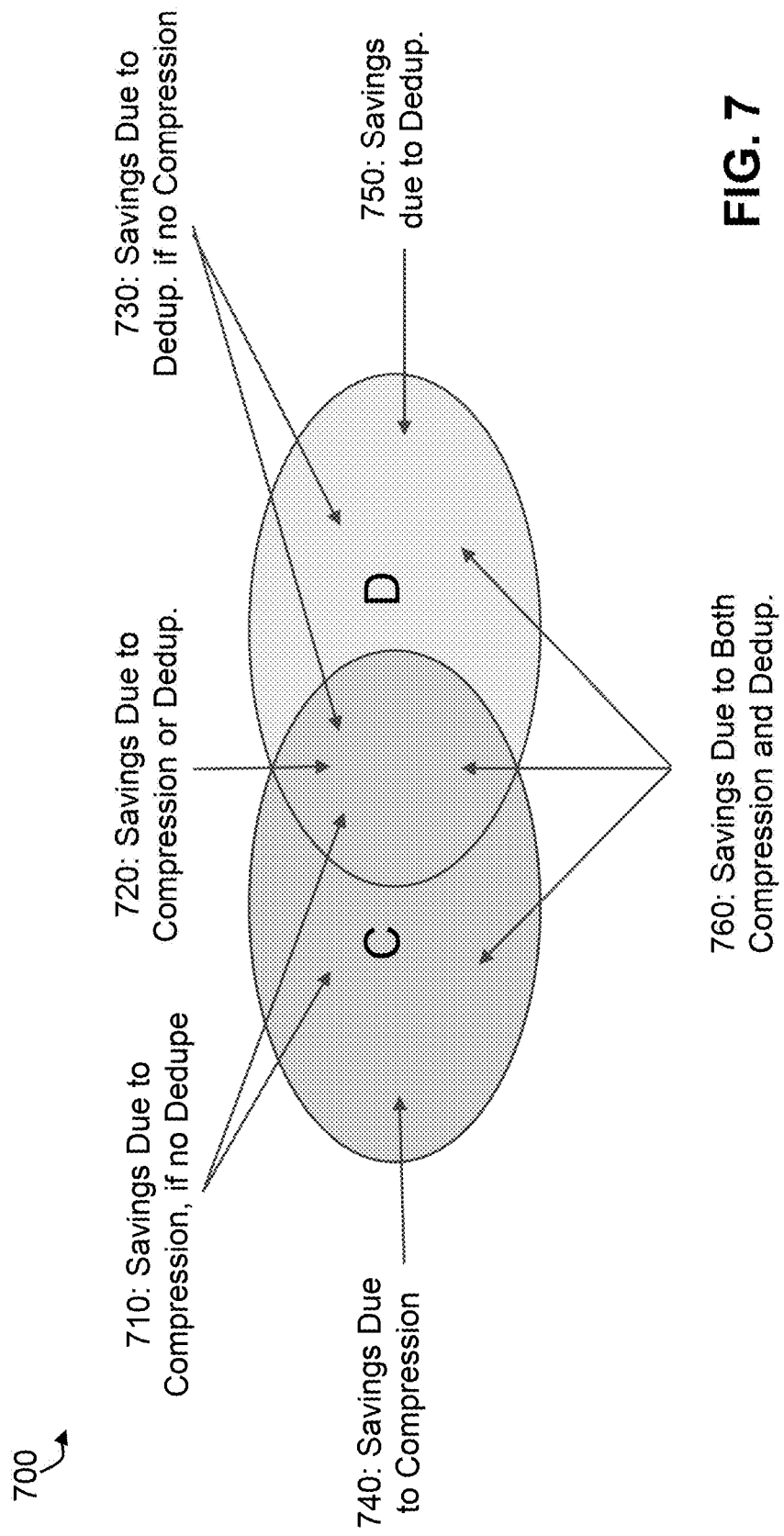
FIGS. 7 and 8 are exemplary Venn diagrams illustrating data reduction space savings due to compression and deduplication, according to one embodiment of the disclosure.
Figure 8:
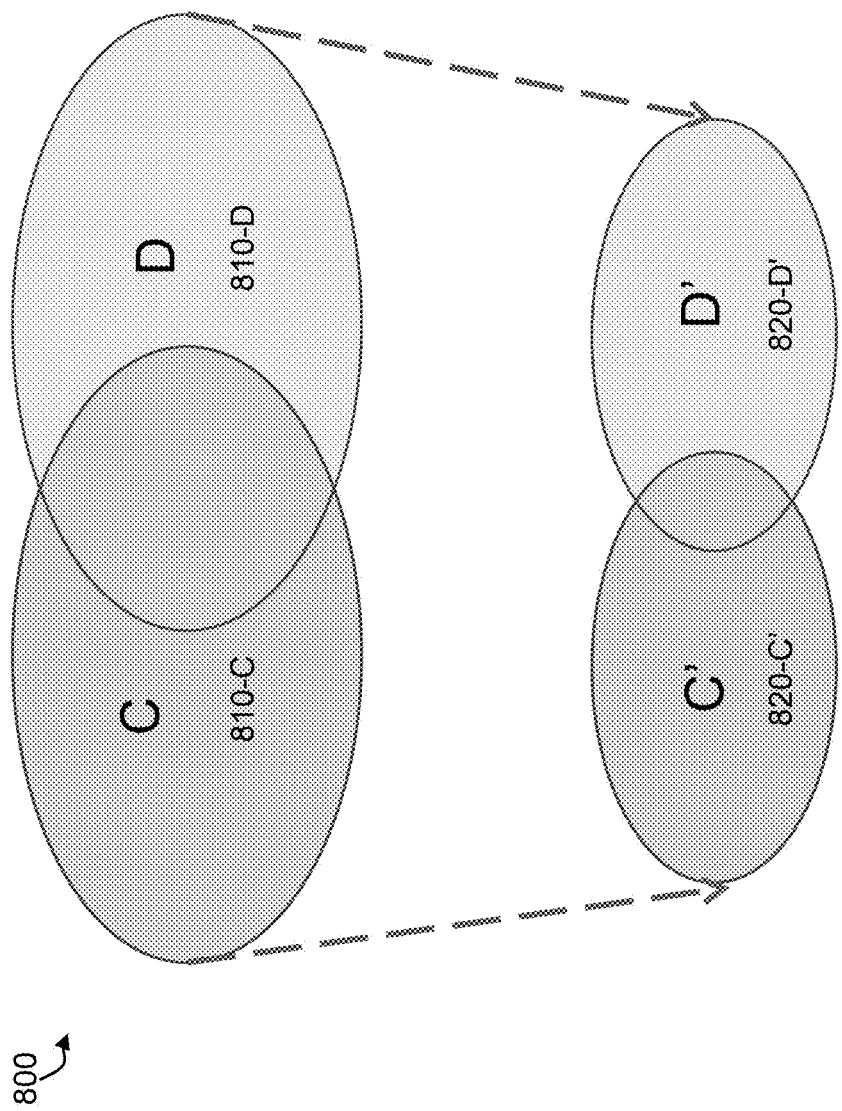

FIGS. 7 and 8 are exemplary Venn diagrams 700, 800 illustrating substantially ideal and real data reduction space savings, respectively due to compression and deduplication, according to embodiments of the disclosure.

As shown in FIG. 7, the exemplary Venn diagram 700 illustrates two intersecting sets, labeled "C" for compression and "D" for deduplication. Set C represents the "savings due to compression if no deduplication" is performed 710 and set D represents "savings due to deduplication if no compression" is performed 730. The intersection of the sets 720 represents the "savings due to either compression or deduplication" and the union of the sets 760 represents the "savings due to both compression and deduplication." In addition, FIG. 7 also illustrates the exclusive "savings due to compression" 740, and the exclusive "savings due to deduplication" 750.

In one or more embodiments, the exemplary space savings/accounting module 152 can therefore selectively report any of the following metrics, at any point in time:

Savings due to compression if no deduplication 710;
Savings due to either compression or deduplication 720;
Savings due to deduplication if no compression 730;
Savings due to compression 740;
Savings due to deduplication 750; and/or
Savings due to both compression and deduplication 760.

In addition, the metrics 710-760 shown in FIG. 7 as substantially ideal values after garbage collection has been performed can also optionally be prorated and reported as real savings.

Thus, as shown in FIG. 8, the substantially ideal savings values can be prorated to real savings. In particular, the ideal compression values 810-C and the ideal deduplication values 810-D can be prorated to the real compression values 820-C' and the real deduplication values 820-D' at a particular point in time, as follows:

C'=C×RealTotalSavings(680)/IdealTotalSavings(675), where:

IdealTotalSavings 675=AUsNeededIfNoDataReduction(610)–AUsNeededAfterDataReduction(635).

RealTotalSavings 680=AUsNeededIfNoDataReduction(610)–ActualAUsUsed(670).

In one or more embodiments, the combined space savings can be expressed, as follows:

$$\text{savings} = 1 - \frac{ActualAUsUsed}{AUsNeededIfNoDataReduction}\%$$

For example, if a client wrote 10 allocation units, and the data reduction techniques reduced the 10 allocation units to only 2 allocation units, then the combined space savings can be expressed, as follows:

$$1 - \frac{2}{10} = 80\% \text{ savings.}$$

In addition, in one or more embodiments, the total amount of garbage in the file system (TotalGarbage 685) can be expressed, as follows:

IdealTotal Savings(675)–RealTotalSavings(680).

FIG. 9 illustrates a number of exemplary data types 900 for data reduction savings, according to an embodiment of the disclosure. As shown in FIG. 9, the exemplary data types 900 for data reduction savings comprise the following:

SpaceSavingsDueToCompression;
SpaceSavingsDueToDedupe;
SpaceSavingsDueToDataReduction; and
SpaceSavingsDueToGarbageCollection.

FIG. 10 illustrates exemplary pseudo code for a deduplication space savings calculation process 1000, according to one embodiment of the disclosure. As shown in FIG. 10, the exemplary deduplication space savings calculation process 1000 performs the following steps:

Establish leaf pointers for allocation units of data in storage system;

For first allocation units of data matching second allocation units of data, replace leaf pointer for first allocation units with deduplication pointers to leaf pointers of second allocation units;

Determine total number of pointers as a sum of number of leaf pointers and number of deduplication pointers;

Determine a difference between total number of pointers and number of leaf pointers; and Provide data reduction attributed to deduplication based on the difference.

CONCLUSION

One or more embodiments of the disclosure provide methods and apparatus for reporting space savings due to data reduction in storage systems. In one or more embodiments, space savings reporting techniques are provided that improve the accuracy of the space savings reporting attributable to compression and/or deduplication.

The foregoing applications and associated embodiments should be considered as illustrative only, and numerous other embodiments can be configured using the techniques disclosed herein, in a wide variety of different applications.

It should also be understood that the disclosed techniques for reporting space savings due to data reduction in storage systems, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for reporting space savings due to data reduction may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as data storage system 116, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of data storage system 116 in illustrative embodiments. The cloud-based systems can include object stores such as Amazon™ S3, GCP Cloud Storage, and Microsoft Azure™ Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the space saving reporting devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. These platforms may also be used to implement at least portions of other information processing systems in other embodiments.

Figure 11:
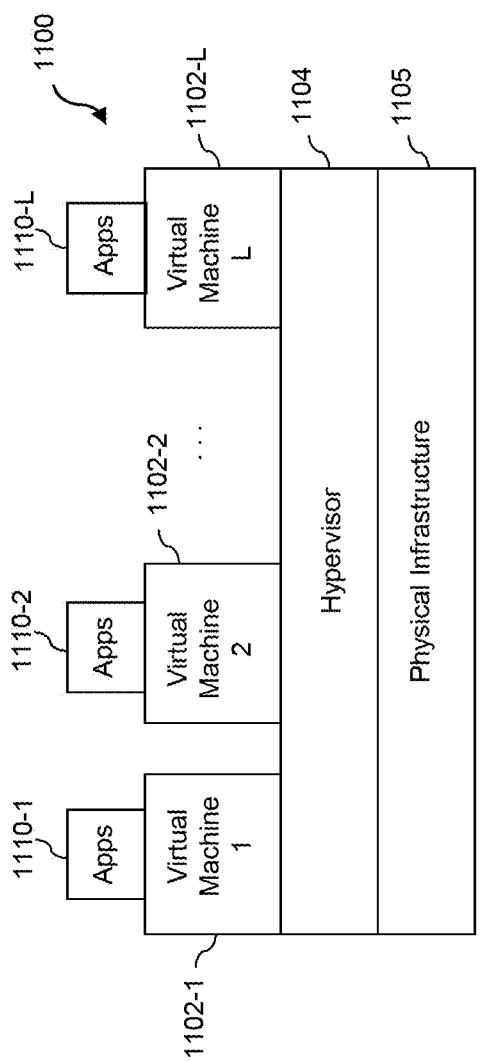
FIG. 11 illustrates an exemplary processing platform that may be used to implement at least a portion of one or more embodiments of the disclosure comprising a cloud infrastructure.

Referring now to FIG. 11, one possible processing platform that may be used to implement at least a portion of one or more embodiments of the disclosure comprises cloud infrastructure 1100. The cloud infrastructure 1100 in this exemplary processing platform comprises virtual machines (VMs) 1102-1, 1102-2, . . . 1102-L implemented using a hypervisor 1104. The hypervisor 1104 runs on physical infrastructure 1105. The cloud infrastructure 1100 further comprises sets of applications 1110-1, 1110-2, . . . 1110-L running on respective ones of the virtual machines 1102-1, 1102-2, . . . 1102-L under the control of the hypervisor 1104.

The cloud infrastructure 1100 may encompass the entire given system or only portions of that given system, such as one or more of client, servers, controllers, or computing devices in the system.

Although only a single hypervisor 1104 is shown in the embodiment of FIG. 11, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 1104 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products, such as VNX™ and Symmetrix VMAX™, both commercially available from Dell EMC. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed space saving reporting systems may each run on a computer, server, storage device or other processing platform element. A given such element may be viewed as an example of what is more generally referred to herein as a "processing device." The cloud infrastructure 1100 shown in FIG. 11 may represent at least a portion of one processing platform.

Figure 12:
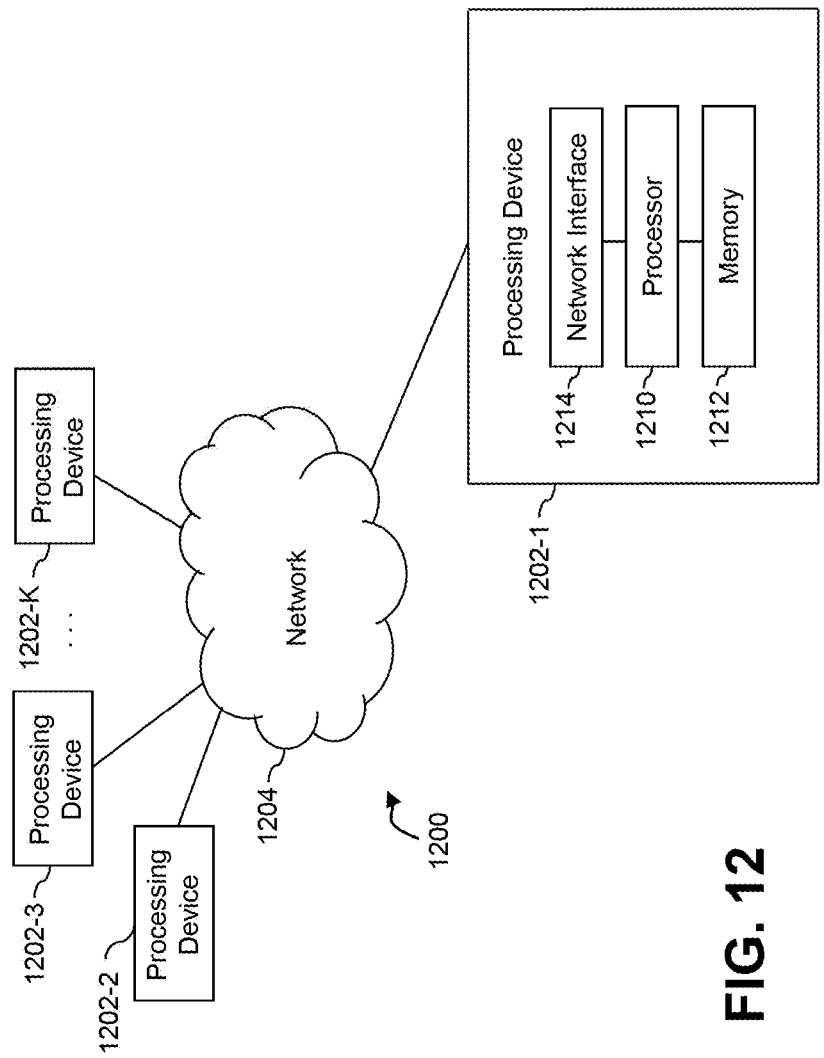
FIG. 12 illustrates another exemplary processing platform that may be used to implement at least a portion of one or more embodiments of the disclosure.

Another example of a processing platform is processing platform 1200 shown in FIG. 12. The processing platform 1200 in this embodiment comprises at least a portion of the given system and includes a plurality of processing devices, denoted 1202-1, 1202-2, 1202-3, . . . 1202-K, which communicate with one another over a network 1204. The network 1204 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1202-1 in the processing platform 1200 comprises a processor 1210 coupled to a memory 1212. The processor 1210 may comprise a microprocessor, a microcontroller, an application specific integrated circuit (ASIC), a field programmable gate array (FPGA) or other type of processing circuitry, as well as portions or combinations of such circuitry elements, and the memory 1212, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 11 or 12, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of pseudo code shown in FIGS. 4 and 10 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute services platforms, and space savings reporting platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   establishing a leaf pointer for each of a plurality of allocation units of data in a storage system;
   for at least a first allocation unit of data matching a second allocation unit of data, replacing said leaf pointer for said first allocation unit with a deduplication pointer to said leaf pointer of said second allocation unit;
   determining, using at least one processing device, a total number of pointers as a sum of a number of said leaf pointers and a number of said deduplication pointers;
   determining, using at least one processing device, a difference between said total number of pointers and said number of said leaf pointers; and
   providing a data reduction attributed to deduplication based on said difference.

2. The method of claim 1, wherein said matching is performed by comparing hash values of said at least first allocation unit of data and said second allocation unit of data.

3. The method of claim 1, further comprising the steps of compressing said plurality of said allocation units of data; and separately reporting said data reduction attributed to said deduplication and said data reduction attributed to said compression.

4. The method of claim 3, further comprising the steps of (i) determining a deduplication ratio based on said data reduction attributed to deduplication and a total number of allocation units needed to store a plurality of files and replicas of said plurality of files in a given file system; (ii) determining said data reduction attributed to said compression, together with said deduplication, based on a difference between (a) a total number of active allocation units and unique uncompressed allocation units, following said compression and said deduplication, and (b) a total number of storage regions needed to store said total number of active allocation units and unique uncompressed allocation units; and (iii) determining said data reduction attributed to said compression independent of said data reduction attributed to said deduplication based on said data reduction attributed to said compression, together with said deduplication, and said deduplication ratio.

5. The method of claim 3, further comprising the steps of (i) determining a number of references to a first total number of active allocation units and unique uncompressed allocation units; (ii) determining a number of references to a second total number of storage regions needed to store said total number of active allocation units and unique uncompressed allocation units; and (iii) determining said data reduction attributed to said compression independent of said data reduction attributed to said deduplication based on a difference between said first total number and said second total number.

6. The method of claim 3, further comprising the steps of (i) determining a first total number of allocation units needed to store a plurality of files and replicas of said plurality of files in a given file system; (iii) determining a second total number of storage regions needed to store a total number of active allocation units and unique uncompressed allocation units, following said compression and said deduplication; and (iii) determining a first total data reduction attributed to said compression and said deduplication based on a difference between said first total number and said second total number.

7. The method of claim 6, further comprising the steps of (i) determining a third total number of allocation units needed to store a plurality of files and replicas of said plurality of files in a given file system; (iii) determining a fourth total number of allocation units needed to store data of the file system, after data reduction; and (iii) determining a second total data reduction attributed to said compression and said deduplication based on a difference between said third total number and said fourth total number.

8. The method of claim 7, determining an amount of garbage in said storage system based on a difference between said first total data reduction and said second total data reduction.

9. A computer program product, comprising a non-transitory machine-readable storage medium having encoded therein executable code of one or more software programs, wherein the one or more software programs when executed by at least one processing device perform the following steps:
    establishing a leaf pointer for each of a plurality of allocation units of data in a storage system;
    for at least a first allocation unit of data matching a second allocation unit of data, replacing said leaf pointer for said first allocation unit with a deduplication pointer to said leaf pointer of said second allocation unit;
    determining, using at least one processing device, a total number of pointers as a sum of a number of said leaf pointers and a number of said deduplication pointers;
    determining, using at least one processing device, a difference between said total number of pointers and said number of said leaf pointers; and
    providing a data reduction attributed to deduplication based on said difference.

10. The computer program product of claim 9, wherein said matching is performed by comparing hash values of said at least first allocation unit of data and said second allocation unit of data.

11. The computer program product of claim 9, further comprising the steps of compressing said plurality of said allocation units of data; and separately reporting said data reduction attributed to said deduplication and said data reduction attributed to said compression.

12. The computer program product of claim 11, further comprising the steps of (i) determining a deduplication ratio based on said data reduction attributed to deduplication and a total number of allocation units needed to store a plurality of files and replicas of said plurality of files in a given file system; (ii) determining said data reduction attributed to said compression, together with said deduplication, based on a difference between (a) a total number of active allocation units and unique uncompressed allocation units, following said compression and said deduplication, and (b) a total number of storage regions needed to store said total number of active allocation units and unique uncompressed allocation units; and (iii) determining said data reduction attributed to said compression independent of said data reduction attributed to said deduplication based on said data reduction attributed to said compression, together with said deduplication, and said deduplication ratio.

13. The computer program product of claim 11, further comprising the steps of (i) determining a number of references to a first total number of active allocation units and unique uncompressed allocation units; (ii) determining a number of references to a second total number of storage regions needed to store said total number of active allocation units and unique uncompressed allocation units; and (iii) determining said data reduction attributed to said compression independent of said data reduction attributed to said deduplication based on a difference between said first total number and said second total number.

14. The computer program product of claim 11, further comprising the steps of (i) determining a first total number of allocation units needed to store a plurality of files and replicas of said plurality of files in a given file system; (iii) determining a second total number of storage regions needed to store a total number of active allocation units and unique uncompressed allocation units, following said compression and said deduplication; and (iii) determining a first total data reduction attributed to said compression and said deduplication based on a difference between said first total number and said second total number.

15. A system, comprising:
    a memory; and
    at least one processing device, coupled to the memory, operative to implement the following steps:
    establishing a leaf pointer for each of a plurality of allocation units of data in a storage system;
    for at least a first allocation unit of data matching a second allocation unit of data, replacing said leaf pointer for said first allocation unit with a deduplication pointer to said leaf pointer of said second allocation unit;
    determining, using said at least one processing device, a total number of pointers as a sum of a number of said leaf pointers and a number of said deduplication pointers;

determining, using at least one processing device, a difference between said total number of pointers and said number of said leaf pointers; and providing a data reduction attributed to deduplication based on said difference.

16. The system of claim 15, wherein said matching is performed by comparing hash values of said at least first allocation unit of data and said second allocation unit of data.

17. The system of claim 15, further comprising the steps of compressing said plurality of said allocation units of data; and separately reporting said data reduction attributed to said deduplication and said data reduction attributed to said compression.

18. The system of claim 17, further comprising the steps of (i) determining a deduplication ratio based on said data reduction attributed to deduplication and a total number of allocation units needed to store a plurality of files and replicas of said plurality of files in a given file system; (ii) determining said data reduction attributed to said compression, together with said deduplication, based on a difference between (a) a total number of active allocation units and unique uncompressed allocation units, following said compression and said deduplication, and (b) a total number of storage regions needed to store said total number of active allocation units and unique uncompressed allocation units; and (iii) determining said data reduction attributed to said compression independent of said data reduction attributed to said deduplication based on said data reduction attributed to said compression, together with said deduplication, and said deduplication ratio.

19. The system of claim 17, further comprising the steps of (i) determining a number of references to a first total number of active allocation units and unique uncompressed allocation units; (ii) determining a number of references to a second total number of storage regions needed to store said total number of active allocation units and unique uncompressed allocation units; and (iii) determining said data reduction attributed to said compression independent of said data reduction attributed to said deduplication based on a difference between said first total number and said second total number.

20. The system of claim 17, further comprising the steps of (i) determining a first total number of allocation units needed to store a plurality of files and replicas of said plurality of files in a given file system; (iii) determining a second total number of storage regions needed to store a total number of active allocation units and unique uncompressed allocation units, following said compression and said deduplication; and (iii) determining a first total data reduction attributed to said compression and said deduplication based on a difference between said first total number and said second total number.

* * * * *